United States Patent Office 2,788,330

Patented Apr. 9, 1957

2,788,330

ANION EXCHANGE RESINS FROM CROSS-LINKED HALOGENATED POLYVINYLAROMATIC POLYMERS

Martin E. Gilwood, Oceanside, N. Y., and Albert H. Greer, Westmont, N. J., assignors to The Permutit Company, New York, N. Y., a corporation of Delaware No Drawing. Application April 21, 1953, Serial No. 350,265

25 Claims. (Cl. 260—2.1)

The present invention relates to novel, synthetic polymeric compositions which are useful in the removal of anions from aqueous solutions and to a novel process for preparing said compositions. The invention also relates to a method of removing anions from an aqueous solution.

Anion exchange resins, in order to be satisfactory for use, must be substantially insoluble in water, dilute acids and alkalies. They must be capable of resisting physical transformation, such as undue swelling, or mechanical disintegration, such as spalling or shattering of the resin beads and granules, when in contact with the solution they are used to treat. They must also have a high useful or operating capacity for removing anions from aqueous solutions, and be capable of being repeatedly regenerated for reuse when they become exhausted. It is also desirable that in addition to a high operating capacity, the resin have a high capacity for removing the weaker anions from solution, such as silica and carbon dioxide. The present invention makes it possible to obtain anion exchange resins which have a significant enhancement in operating capacity, as well as concomitant improvements in other desirable properties, over those of the anion exchange resins with which the prior art is familiar.

It is an object of the present invention to provide novel anion exchange resins which, while possessing all of the essential properties of a successful anion exchange resin, possess an unusually high operating capacity as well as a high capacity for the removal of weaker anions from aqueous solutions.

It is an additional object of the present invention to provide a means for enhancing the operating capacity, and other capacities and properties, of anion exchange resins over those of related anion exchange resins of the prior art.

It is a further object to provide a novel process for the removal of anions, and especially weaker anions, from aqueous solutions.

It is an additional object to provide a novel process for producing the novel anion exchange resins of the present invention.

Other objects will be apparent to those skilled in the art from a reading of the description which follows.

In U. S. Patents Nos. 2,631,999; 2,632,000 and 2,632,001 to McMaster et al. are described anion exchange resins which are quaternary ammonium derivatives of a haloalkylated, halogenated copolymer resin of a polyvinyl aromatic hydrocarbon and certain monovinyl aromatic hydrocarbons. The haloalkylated, halogenated copolymer resins described in the patents contain halogen other than haloalkyl halogen. When considered on the basis of the basic halogenated copolymer resin or polymerizate, they contain 4.9% halogen upward to 40% or more. This amount of non-haloalkyl halogen when calculated on the basis of the unhalogenated polymer is appreciably higher, i. e. a minimum of 7.7%. We have discovered that with the aminoalkyl derivatives of a halogenated copolymer resin of a monovinyl aryl compound and a polyvinyl aryl crosslinking compound of the invention in which the halogenated copolymer resin contains up to 4.0% halogen, have a significantly increased operating capacity over otherwise equivalent anion exchange resins in which the halogen content of the copolymer resin is 7.7% or greater. The operating capacity of the anion exchange resins of the present invention is also significantly greater than an otherwise equivalent anion exchange resin containing no halogen in the copolymer resin.

The present invention comprises a water insoluble anion exchange resin which is an amino-alkyl or quaternary ammonium-alkyl derivative of a halogenated copolymer of a monovinyl aryl compound and a polyvinyl aryl crosslinking compound; said halogenated copolymer containing no more than 4.0% halogen. The quaternary ammonium-alkyl derivatives are preferred since they are more highly basic and are more effective in adsorbing weaker anions. The quarternary ammonium and amine groups may be substituted with alkyl, aralkyl or alkanol groups. The amine groups may be primary, secondary or tertiary amine groups. It is desirable that, in any event, the alkyl, aralkyl and alkanol groups be of the "lower" category, i. e., each having 8 or less carbon atoms and in the case of alkyl and alkanol groups, preferably not more than 4 carbon atoms each. The preferred quaternary ammonium alkyl derivatives contain the following group:

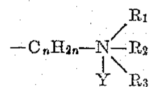

in which $R_1$, $R_2$ and $R_3$ are alkyl, alkanol and aralkyl groups as defined above. $n$ is an integer of value from 1 to 4. Best results are obtained where $n$ is 1 and the $-C_nH_{2n}-$ group is a methylene group. Y is an anion, preferably one of a mineral acid, such as chloride, bromide, sulfate, etc., or when in the anion exchanging condition, is a hydroxyl group. The anion exchange resins of the invention have excellent properties for adsorbing weak anions when one or both of $R_1$ and $R_2$ are lower alkanol groups, particularly where one or both of these groups is the ethanol group.

In preparing the anion exchange resins of the invention, we begin with the preparation of a halogenated copolymer of a monovinyl aryl compound and a polyvinyl aryl crosslinking compound. The monovinyl aromatic compounds are suitably vinyl aromatic hydrocarbons, such as styrene, ortho-, meta- and para-methyl and ethyl styrenes, vinyl naphthalene, vinyl anthracene and the homologues of these compounds. Styrene is preferred. Also, both the monovinyl and polyvinyl aryl moieties of the copolymer may comprise nuclear substituted chlorine or bromine substituted vinyl or polyvinyl aryl compounds, such as the ortho-, meta- and para-chloro and bromo styrenes copolymerized with other diluting monovinyl aryl compounds. The concentration of the halogenated monovinyl and polyvinyl aryl compounds in the copolymer should be adjusted to provide a halogen concentration of less than 4.0% in the copolymer resin.

Among the polyvinyl aryl crosslinking compounds which may be used are compounds containing two or more vinyl groups and particularly divinyl aromatic hydrocarbons. Some of these crosslinking compounds are the following: the divinyl toluenes and naphthalenes, divinyl ethyl benzenes, divinyl xylenes and divinyl benzenes. The divinyl benzenes are the divinyl hydrocarbons of first choice. As mentioned above, the divinyl aryl compound may also be nuclear halogenated to provide halogen for the copolymer resin.

The copolymer resins for use in the invention shall contain a predominant amount, on a molar basis, of the monovinyl aryl compound or, stated in another way, more than half of the total number of moles of reactants in preparing the copolymer shall be monovinyl aryl compounds. It is preferred that the monovinyl aryl compounds constitute from 60 to 99.9%, on a molar basis, of the copolymer. Therefore, the divinyl compounds should constitute from 0.1 to 40% of the mixture on a molar basis. Increased amounts of crosslinking compounds produce a copolymer which is increasingly dense and which becomes correspondingly difficult to haloalkylate in subsequent steps. Best results are obtained where the monovinyl aryl moiety constitutes from 85.0 to 99.5% of the copolymer resin and the crosslinker from 0.5 to 15% (both on a weight basis). The optimum compositions of the copolymer resin are those prepared from about 4–6% by weight of divinyl aryl crosslinker compound and 94–96% by weight of monovinyl aryl compound. A polymerizate or copolymer resin having a particle size range of between 15 to 60 mesh is most desirable.

The polymerization of the copolymer resin for use in the invention is conducted in the presence of well known oxidizing catalysts. These catalysts include ozone, oxygen, organic peroxides, such as acetyl peroxide, tertiary-butyl hydroperoxide, benzoyl peroxide, hydrogen peroxide, the so-called "per" salts, such as the water soluble persulfates, and the azoketonitriles, such as azobisisobutyronitrile and azobiscyclopropiopropylnitrile. The catalyst may be employed in suitable amounts ranging from 0.1% to about 2.0% by weight based on the weight of monomeric material to be polymerized.

During the polymerization of the copolymer resin, it may be advisable to add suspending agents, such as gelatine, and vegetable gums, such as carboxymethylcellulose, methylcellulose or casein, and small amounts of other materials, such as boric acid and alkali.

If the copolymer resin does not already contain halogen as a result of incorporating a halogen-bearing component into the copolymer resin or if the copolymer resin does not contain the desired amount of halogen, halogen is next introduced into the resin in desired amounts. The halogenating agents may be elemental chlorine or bromine with the use of the common halogenating catalysts, such as iodine, ultra-violet light, etc. Those anion exchange resins prepared by catalyzing the elemental halogenation with ultra-violet light demonstrate improved mechanical stability and resistance to shattering and breaking of the particles upon repeated usage and regeneration. The halogenation of the copolymer resin may be accomplished by the halogen containing halogenating reagents, sulfuryl chloride, sulfuryl monochloride, phosphorus pentabromide, etc., with or without the presence of peroxide catalysts. The copolymer resin is halogenated until it contains the desired amount of halogen, although in no case have the benefits of the present invention been realized where the halogen content exceeds about 4.0% of the weight of the copolymer resin.

It has been discovered that the benefits of the present invention may be realized in varying degrees, depending on the concentration of halogen in the copolymer resin. The copolymer should, however, contain from 0.2 to 4.0% halogen. Where the halogen in the copolymer resin is introduced solely as nuclear substituted halogen by means of copolymerizing a chlorostyrene in preparing the resin, the resin may contain from 0.2 to 4.0% chlorine. Best results obtained so far are with a chlorine content of about 1.5%.

When chlorine is introduced into the copolymer resin by means of a chlorine containing inorganic chemical, such as sulfuryl chloride and phosphorus pentachloride, subsequent to the polymerization which forms the resin, best results are obtained from the monoalkanol-dialkyl quaternary ammonium substituted alkyl type of anion exchanger (i. e., dimethylethanolamine type precursor) containing 1.5 to 3.0% chlorine in the copolymer resin, with optimum results with about 1.5% chlorine. With the trialkyl substituted quaternary ammonium substituted alkyl type of anion exchanger (i. e., trimethylamine type precursor), the chlorine content should preferably be between 1.5 and 4.0%, and optimum results so far have been obtained at a concentration of about 2.0% chlorine. The halogens contemplated in the halogenated copolymer resins are chlorine and bromine.

We have observed that the greatest increase in operating capacity is obtained by halogenation subsequent to polymerization of the resin. To date, the greatest increase in operating capacity has been obtained by the use of sulfuryl chloride as the source of halogen.

In defining the percentage of halogen in the halogenated copolymer resin in the specification and claims, we mean the amount of halogen substituted on the copolymer resin based on its weight before it has been halogenated.

By preparing the anion exchange resins of the invention from halogenated copolymer resins containing the prescribed amounts of halogen in accordance with the present invention, it is possible to obtain an enhancement of the operating capacity of the resins which is from 10 to 50% of that of equivalent anion exchange resins which do not contain the prescribed and limited amount of halogen. In addition to the increase in operating capacity, other concomitant advantages are usually obtained, such as an improvement in the basicity value (ability to remove weakly acidic anions), an increase in ultimate capacity, as well as an improved mechanical stability of the resin particles to shattering and breaking after repeated usage and regeneration of the anion exchange resin. The advantages of the present invention accrue only when the halogen content falls within the prescribed limits set forth above. When the maximum limit prescribed for halogen content is exceeded, the advantages of the invention do not obtain and very often an increase in halogen content above the prescribed limit results in an anion exchange resin having poorer operating capacity and other properties than an anion exchange resin having no halogen in the copolymer resin.

The mechanism or principle by which the present invention operates is not known to us. Assuming that all of the halogen present in the copolymer resin is converted to quaternary ammonium groups, which is probably not true, this would not be sufficient to account for the increase in capacities of the anion exchange resins. Also, presumably a large part, at least, of the halogen is substituted on the aromatic nuclei and this type of halogen substitution is not usually prone to react with amines under the conditions which we utilize. Nor are we certain of where halogen, when introduced into the resin after polymerization, is substituted or added. Some of the halogen may become substituted on the polyethylene bridges of the copolymer resin. In spite of the lack of a theory for accounting for the increased capacity of the resins of the invention, superior results are obtained.

The next step in the preparation of the anion exchange resins of this invention is the haloalkylation of the halogenated copolymer resin. This step involves introducing into the copolymer a plurality of bromoalkyl or preferably chloroalkyl groups. This entails the substitution onto the aromatic nuclei of the copolymer resin, groups having the general formula:

$$—C_nH_{2n}—X$$

wherein X is chlorine or bromine and $n$ has the same definition as above. While it is contemplated that $n$ may contain from 1 to 4 carbon atoms, it is preferred to employ those compounds having chloromethyl groups substituted in the insoluble copolymer resin because these products are the most reactive. The carbon atoms in the haloalkyl group may be in a straight or a branched chain. The preferred method of haloalkylation is by reacting the insoluble copolymer resin with a haloether or a mixture of an alkyl halide and a halogen acid and a Friedel-Crafts catalyst, such as aluminum chloride, zinc chloride, stannic chloride, etc. One may also haloalkylate by reacting the copolymer resin with an aldehyde and a halogen acid (e. g., paraformaldehyde and hydrochloric acid). Alternatively, one may use a dihaloalkane and a Friedel-Crafts catalyst (e. g., ethylene dichloride and aluminum chloride). Methods of chloroalkylating are described in "Organic Reactions," vol. 1, chapter 3, page 63 et seq. (1942). It is desirable to have several of the haloalkyl groups, which become substituted upon the aromatic nuclei of the copolymer resin, for each aromatic nucleus, for each is capable of conversion to an amine group and the greater the number of these, the greater will be the capacity of the anion exchange resin.

In the event that the copolymer resin has been prepared from alkyl substituted monovinyl aryl compounds such as the methyl styrenes, it is possible to prepare the halo-alkyl derivative of a halogenated copolymer resin by direct chlorination or bromination of the alkyl substituent on the aryl ring. In this instance, it is desirable to first introduce the small amount of nuclear halogenation (maximum of 4.0%) by halogenating with a nuclear-directing carrier such as iodine, ferric chloride, ion, aluminum chloride, etc. The nuclear-directing carrier is then removed from the reaction mixture and halogenation of the alkyl side chain undertaken with elemental bromine or chlorine. If there are more than a single alkyl group for each aromatic nucleus, a corresponding number of haloalkyl groups will be formed.

The final step in preparing the anion exchange resins of the invention is the amination step to prepare the amino alkyl derivative or the quaternary ammonium alkyl derivative. This reaction is preferably carried out by adding the amine to the haloalkylated, halogenated copolymer while the latter is suspended and agitated in a liquid which is a solvent for the amine. The mixture may be allowed to react at room temperature or at elevated temperatures, after which the resin containing the quaternary ammonium salt groups is removed from the liquid reaction medium. If a primary amine is used in the amination in the preparation of the final product, the anion exchange resin will be a secondary amine derivative of the haloalkylated, halogenated copolymer resin. If a secondary amine is used in the amination of the preparation of the final product, the anion exchange resin will be a tertiary amine derivative of the haloalkylated, halogenated copolymer resin. If a tertiary amine is used, the final product will be a quaternary ammonium derivative. If ammonia is used, the final product will be the primary amine derivative. The quaternary ammonium type of anion exchange resin is preferred because it is more highly basic and will remove weaker anions from solution.

Among the primary and secondary amines which may be used for amination are the lower alkyl amines, such as propylamine, ethylenediamine, dimethylamine, diethylamine, dipropylamine and di-n-butylamine; the lower alkanol amines, such as methyl ethanol amine, ethyl ethanol amine, and diethanolamine; the aralkylamines, such as dibenzylamine, methylaniline; the polyalkylene polyamines, such as diethylene triamine, triethylene tetraamine and tetraethylene pentaamine; and the cyclic amines, such as piperazine, piperidine and morpholine. Of this group, the polyalkylene polyamines are preferred.

Among the tertiary amines which may be used for amination are free bases such as amines containing alkyl, aralkyl and alkanol groups. Suitable tertiary amines are typified by the following: trimethyl-, triethyl- and tripropylamines, benzyldimethylamine, dimethylethanolamine, methyldiethanolamine, and the like. Dimethylethanolamine is preferred.

Alternately, but less satisfactorily, one may prepare the quaternary ammonium derivatives of the haloalkylated, halogenated copolymer resins by reacting the haloalkylated derivatives with ammonia, primary or secondary amines, followed by treatment of the resulting primary, secondary or tertiary amine with a quaternizing agent. Among the well known group of quaternizing agents are the alkyl halides, such as methyl chloride, bromide and iodide, ethyl chloride, bromide and iodide, etc.; dialkyl sulfates, such as dimethyl, diethyl, dipropyl, dibutyl sulfates; epihalohydrins, such as epichlorohydrin; and alkyl esters of aryl sulfonates, such as methyl toluene sulfonate and methyl benzene sulfonate. Because of the greater cost of reagents, this method is less desirable.

For purposes of anion exchange, it is necessary to first convert the quaternary ammonium salts which are usually obtained from the methods of preparation described above to the corresponding quaternary ammonium hydroxide form by treating the anion exchange resin with a dilute alkali, such as a 5% solution of sodium hydroxide.

The invention also comprises the novel process for removing anions from an aqueous solution, comprising contacting the solution with the quaternary ammonium or amine derivatives of the halogenated copolymerizates of the invention. The quaternary ammonium or amine derivatives of the halogenated copolymerizates are present in sufficient quantity to remove substantially all the anions from the aqueous solution. This may be done by passing the solution through a column packed with the anion exchange resin. The anion may be removed satisfactorily from the resin and the resin thus regenerated by washing it with a dilute alkali, preferably sodium hydroxide, which alkali will form a soluble salt with the adsorbed anions.

In the order to disclose more clearly the nature of the present invention, specific examples illustrating the preparation of typical compounds will hereinafter be described. This is done solely by way of example and is intended neither to delineate the scope of the invention nor limit the ambit of the appended claims.

EXAMPLE 1

A. *Preparation of copolymer resin*

To about 900 ml. of water at 50–80° C. was added a solution of 278 grams of styrene, 21.8 grams of divinyl benzene solution containing 55% divinyl benzene (4% of the weight of styrene) and 45% ethyl vinyl benzene and 1.1 grams of benzoyl peroxide. The mixture was stirred for 12 hours at 50–80° C. when polymerization became complete. The beads of resin that formed were filtered, washed with water and dried at 110–130° C.

B.—*Preparation of chloromethyl derivative of chlorinated copolymer resin*

Two hundred grams of the polymer obtained in part A was suspended in 590 grams of propylene dichloride and the mixture heated to 50° C. Twenty grams of sulfuryl chloride was added at once and the mixture stirred for 30 minutes at 50° C. The mixture was then cooled to 15° C. by an external ice bath and a chlorine content of the polymer was 1.9%. Two hundred grams of monochloromethylether was added followed by 117 grams of anhydrous aluminum chloride added over one hour. The mixture was stirred at 15–20° C. for an additional 4 hours. The suspension was then quenched in ice water, the insoluble beads filtered and washed with water.

C.—*Preparation of trimethylamine derivative of chloromethylated, chlorinated resin*

The chloromethylated beads obtained in part B were suspended in 350 grams water and 470 grams of a 25% solution of trimethylamine in water was added for 2 hours. The mixture was then stirred for an additional 4 hours at 20° C. The mixture was then neutralized with sulfuric acid and the propylene dichloride distilled off at 90° C. The beads were then filtered and washed with water. The material had a basicity value of 20.4 kg./cu. ft., an ultimate capacity of 25 kg./cu. ft., a density of 334 g./l. and an operating capacity of 15.8 kg./cu. ft. using 4 lbs./cu. ft. of sodium hydroxide as a 5% solution as the regenerant with a 200 p. p. m. free mineral acid water containing 17 p. p. m. silica. An otherwise equivalent material prepared without the use of sulfuryl chloride had an operating capacity of 10.0 kg./cu. ft. using the same regenerant dosage. There was thus obtained an increase in operating capacity of 50.4%.

Based upon the ultimate capacity value obtained for the anion exchange resin, it is calculated that the copolymer resin contained about 0.75 chloromethyl groups per aromatic nucleus prior to being aminated with trimethylamine.

EXAMPLE 2

*A.—Preparation of trimethylaminederivative of chloromethylated, chlorinated copolymer resin*

Approximately 600 grams of wet chloromethylated beads prepared as in part B of Example 1, except that they had a chlorine content on the basis of the copolymer resin of 2.6% was suspended in 325 ml. of water and 280 grams of a 70% aqueous solution of trimethylamine was added. The mixture was stirred and heated to 50° C. for six hours, cooled, filtered and the resin washed with water.

EXAMPLE 3

*A.—Preparation of chlorinated copolymer resin*

A copolymer resin was prepared which consisted of 3.2% aromatic crosslinker in the following manner: To about 900 ml. of water heated to 60–90° C. was added 259 grams of styrene, 13.6 grams of orthochlorostyrene, 15.8 grams of divinyl benzene solution containing 55% divinyl benzene (3.2% of the weight of styrene and chlorostyrene) and 45% ethyl vinyl benzene and about 1.1 grams of benzoyl peroxide. The mixture was heated for about 12 hours, after which polymerization was complete. The resulting product was washed with water and dried at between 110–130° C. for 3 hours. Upon analysis, the chlorine content was found to be 1.5%.

*B.—Preparation of chloromethyl derivative of chlorinated copolymer resin*

About 200 grams of the chlorinated copolymer resin obtained in part A above was suspended in a mixture of 590 grams of propylene dichloride and 200 grams of monochloromethylether. The mixture was cooled by an external bath to 15° C. and 117 grams of anhydrous aluminum chloride was added over 1 hour at 15–20° C. The mixture was stirred at this temperature for an additional 5 hours. It was then poured into a large amount of ice water, the insoluble particles filtered and washed with water.

*C.—Preparation of dimethylethanolamine derivative of chloromethylated, chlorinated resin*

The resulting chloromethylated beads obtained in part B above were suspended in 488 grams of water and 248 grams of a 70% solution of dimethylethanolamine in water was added. The mixture was stirred for 5 hours at 50° C. The quaternary ammonium polymeric salt was then washed with water. The anion exchange resin was regenerated with dilute sodium hydroxide, washed with water and found to have a density of 300 g./l. and when using 6 lbs./cu. ft. of sodium hydroxide as a 5% solution, an operating capacity of 18.0 kg./cu. ft. was obtained. An otherwise equivalent material prepared without the use of orthochlorostyrene had an operating capacity of 17.0 kg./cu. ft.

EXAMPLE 4

*A.—Preparation of trimethylamine derivative of chloromethylated, chlorinated copolymer resin*

Approximately 600 grams of wet chloromethylated beads obtained in part B of Example 3 was suspended in 352 ml. of water and 470 grams of a 25% solution of trimethylamine in water was added. The mixture was stirred at room temperature for 4 hours, filtered and the resin washed with water. The material had a density of 307 g./l. and when regenerated with a dosage of 4 lbs./cu. ft. of sodium hydroxide as a 5% solution, an operating capacity of 11.3 kg./cu. ft. was obtained. An otherwise equivalent material prepared in a similar fashion without the use of orthochlorostyrene gave upon similar regeneration an operating capacity of 10.0 kg./cu. ft. Thus there was obtained an increase in operating capacity of 11.3%.

EXAMPLE 5

*A.—Preparation of chloromethyl, chlorinated derivative of copolymer resin*

Approximately 220 grams of the copolymer obtained in part A of Example 1 was suspended in 650 grams of propylene dichloride. The mixture was heated with stirring to 50° C. and a crystal of iodine dissolved therein. A slow stream of chlorine was then introduced for one-half minute and chlorination stopped and the mixture cooled to 15° with an external ice bath. A sample of the material was removed and found to contain 2.0% chlorine. Approximately 200 grams mono-chloromethylether was added and 117 grams of anhydrous aluminum chloride was added with stirring for one hour at 10–15° C. Stirring was continued for 4 hours whereupon the mixture was poured into ice water and the particles filtered from solution and washed with water.

*B.—Preparation of dimethylethanolamine derivative of chloromethylated, chlorinated copolymer resin*

The chloromethylated, chlorinated beads obtained in part A were suspended in 239 grams of water and 250 grams of a 70% solution of dimethylethanolamine in water was added. The mixture was heated to 50° C. for 6 hours, neutralized with sulfuric acid and the propylene dichloride distilled off.

The examples describe the preparation of anion exchange resins based on styrene and divinyl benzene in which the divinyl benzene crosslinker is present in amounts of 3.2 and 4% of the copolymer resin. However, it should be understood that other proportions of crosslinker may be used and, as has been stated above, other polymerizates than that of styrene and divinyl benzene may be used with success. Also, other amounts of halogen may be used if within the range specified above in the specification. By resorting to the teachings of the present specification and the general knowledge common to the art, anion exchange resins of halogenated copolymer resins as contemplated by the present invention may be prepared.

EVALUATION TESTS

Certain data are given for the products prepared in the above examples which are of value in assessing the usefulness of highly basic anion exchange resins. The method used for determining those values which are not the subject of standardized tests is described below.

As used in the examples and elsewhere in this specification, the term "basicity value" (sometimes referred to as "salt-splitting capacity") is a measure of the capacity of the anion exchange resin to remove the anions of weak acids. Since the value of a highly basic anion exchange resin may often reside in its ability to remove the anions of weak acids, as well as those of strong acids, this is a critical value of the performance of any basic anion exchange resin. As expressed here, this value is obtained by passing 270 ml. of a 0.75 normal sodium hydroxide solution through a 16 mm. column containing 40 ml. of the anion exchange resin at a flow rate of approximately 5 ml. per minute. This places the anion exchange resin or polymerizate in the hydroxide exchanging condition. The resin bed is rinsed as free as possible of phenolphthalein alkalinity with distilled water. 750 ml. of 0.5 normal sodium chloride solution is next passed through the resin bed at a flow rate of 7.5 ml. per minute. The column is washed with distilled water. The effluent and washings from the sodium chloride treatment are collected, mixed and titrated with 0.02 normal sulfuric acid solution to a methyl orange endpoint. Since the strongly basic anion exchange resin will remove chloride ion from the sodium chloride solution and convert sodium chloride to sodium hydroxide, this determination permits the calculation of the sodium chloride converted to sodium hydroxide giving the "basicity value" capacity of the anion exchange resin. This sodium chloride splitting value is expressed in kilograins of calcium carbonate per cubic foot of anion exchange resin. Resins having a high "basicity value" will have a high capacity for the removal of weak acids, such as silicic acid and carbonic acid from solutions.

The term "ultimate capacity" used in the examples and elsewhere in the specification is determined by placing 40 ml. of resin, which has first been placed in the chloride form by passing an excess solution of dilute hydrochloric acid over the resin followed by washing with water, in a column of 16 mm. size and through this column is passed 1000 ml. of 0.75 normal sodium hydroxide at the rate of 5 ml./min. The resin bed is then washed free of phenolphthalein alkalinity with distilled water. Next 800 ml. of 0.25 normal hydrochloric sulfuric acid solution (a ratio of 1.5 parts of hydrochloric to 2.5 parts of sulfuric) is passed through the resin bed at a flow rate of 10 ml./min. Next 700 ml. of distilled water is passed through the tube. The effluent is collected and mixed and an aliquot is titrated to determine the residual acid. From this, the total amount of acid absorbed may be computed in terms of kg./cu. ft. of calcium carbonate which gives the total or ultimate capacity of the resin.

It is desirable that for use as anion exchange resins, the quaternary ammonium derivatives of the copolymers of the invention be converted to the corresponding quaternary ammonium hydroxide derivatives. This result is accomplished by passing a dilute aqueous solution of an alkali, such as sodium hydroxide, over the quaternary ammonium derivative of the copolymer.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. An anion exchange resin of improved operating capacity, which comprises the product produced by first haloalkylating a halogen-containing copolymer resin comprising a halogen-containing polymerizate of a vinyl aromatic hydrocarbon and a polyvinyl aryl crosslinker compound, said halogenated copolymer resin containing between about 0.2% and 4.0% halogen before being haloalkylated, said haloalkylated product containing at least about 0.75 haloalkyl groups per aromatic nucleus, and then treating the resulting haloalkylated, halogenated copolymer resin with an amine.

2. An exchange resin of improved operating capacity, which comprises the product produced by first chloromethylating a halogen-containing copolymer resin comprising a halogen-containing polymerizate of a vinyl aromatic hydrocarbon and a polyvinyl aryl crosslinker compound, said halogenated copolymer resin containing between about 0.2% and 4.0% halogen before being chloromethylated, said chloromethylated product containing at least about 0.75% chloromethyl groups per aromatic nucleus, and then treating the resulting chloromethylated, halogenated copolymer resin with an amine.

3. An anion exchange resin as described in claim 2, in which the halogen is chlorine.

4. An anion exchange resin as described in claim 3 in which the vinyl aryl compound forms a predominant part of the copolymer resin.

5. An anion exchange resin as described in claim 3 in which the vinyl aryl compound comprises 60% to 99.9% on a molar basis of the copolymer resin.

6. An anion exchange resin as described in claim 3 in which the monovinyl aryl compound is styrene.

7. An anion exchange resin as described in claim 3 in which the crosslinker is a divinyl aromatic hydrocarbon.

8. An anion exchange resin as described by claim 3 in which the amine is an alkanolamine.

9. An anion exchange resin as described by claim 3 in which the amine is a tertiary amine.

10. An anion exchange resin of improved operating capacity, which comprises the product produced by first halogenating a copolymer resin comprising a polymerizate of a vinyl aromatic hydrocarbon and a polyvinyl aryl crosslinker compound until the copolymer resin contains between about 0.2% and 4.0% halogen, then haloalkylating the resulting halogenated copolymer resin, and finally treating the resulting haloalkylated, halogenated copolymer resin with an amine.

11. An anion exchange resin of improved operating capacity, which comprises the product produced by first chlorinating a copolymer resin comprising a polymerizate of a vinyl aromatic hydrocarbon and a polyvinyl aryl crosslinker compound until the copolymer resin contains between about 0.2% and 4.0% chlorine, then chloromethylating the resulting chlorinated copolymer resin until it contains at least about 0.75 chloromethyl groups per aromatic nucleus, and finally treating the resulting chloromethylated, chlorinated copolymer resin with an amine.

12. An anion exchange resin as described by claim 11 wherein the chlorination is accomplished by elemental chlorine.

13. An anion exchange resin as described by claim 11 wherein the chlorination is accomplished by a chlorinating agent.

14. An anion exchange resin as described in claim 13 wherein the chlorinating agent is sulfuryl chloride.

15. An anion exchange resin as described in claim 11 wherein the amine is an alkanolamine.

16. An anion exchange resin as described in claim 11 wherein the amine is a tertiary aliphatic amine.

17. A method of removing anions from solutions which comprises bringing such solutions into contact with the anion exchange resin of claim 1.

18. A method of removing anions from solutions which comprises bringing such solutions into contact with the anion exchange resin of claim 3.

19. A method of removing anions from solutions which comprises bringing such solutions into contact with the anion exchange resin of claim 10.

20. The process of producing an anion exchange resin, which comprises first haloalkylating a halogen-containing copolymer resin comprising a halogen-containing polymerizate of a vinyl aromatic hydrocarbon and a polyvinyl aryl crosslinker compound, said halogenated copolymer resin containing between about 0.2% and 4.0% halogen before being halogenated, until the halogen-containing copolymer resin contains at least about 0.75 haloalkyl groups per aromatic nucleus, and then treating the resulting haloalkylated, halogenated copolymer resin with an amine.

21. The process of producing an anion exchange resin, which comprises first chloromethylating a chlorine-containing copolymer resin comprising a chlorine-containing polymerizate of a vinyl aromatic hydrocarbon and a polyvinyl aryl crosslinker compound, said chlorine-containing copolymer resin containing between about 0.2% and 4.0% chlorine before being chloromethylated, until the chlorine-containing copolymer resin contains at least about 0.75 chloromethyl groups per aromatic nucleus, and then treating the resulting chloromethylated, chlorine-containing copolymer resin with an amine.

22. The process of producing an anion exchange resin, which comprises first preparing a chlorinated copolymer resin by copolymerizing two or more monovinyl aromatic hydrocarbon compounds, one of which compounds contains nuclear substituted chlorine, with a polyvinyl aryl crosslinker compound, with the resulting copolymer resin containing from about 0.2% to 4.0% chlorine, next haloalkylating the resulting chlorine-containing copolymer resin until it contains at least about 0.75 haloalkyl groups per aromatic nucleus and then treating the resulting product with an amine.

23. The process of producing an anion exchange resin, which comprises first halogenating a copolymer resin comprising a polymerizate of a vinyl aromatic hydrocarbon and a polyvinyl aryl crosslinker compound until the copolymer resin contains between about 0.2% and 4.0% halogen, next haloalkylating the resulting halogenated copolymer resin, and finally treating the resulting haloalkylated, halogenated copolymer resin with an amine.

24. The process of producing an anion exchange resin, which comprises first chlorinating a copolymer resin comprising a polymerizate of a vinyl aromatic hydrocarbon and a polyvinyl aryl crosslinker compound until the copolymer resin contains between about 0.2% and 4% chlorine, next chloromethylating the resulting chlorinated copolymer resin until it contains at least about 0.75 chloromethyl groups per aromatic nucleus, and finally treating the resulting chloromethylated, chlorinated copolymer resin with an amine.

25. A process as described by claim 24 in which the amine is a member selected from the class consisting of an alkanolamine and a tertiary aliphatic amine.

References Cited in the file of this patent

UNITED STATES PATENTS

| | | |
|---|---|---|
| 2,614,099 | Bauman | Oct. 14, 1952 |
| 2,629,710 | McBurney | Feb. 24, 1953 |
| 2,632,000 | McMaster | Mar. 17, 1953 |